No. 670,940. Patented Apr. 2, 1901.
J. C. SCHREDER.
FRUIT GATHERER.
(Application filed May 9, 1900.)
(No Model.)
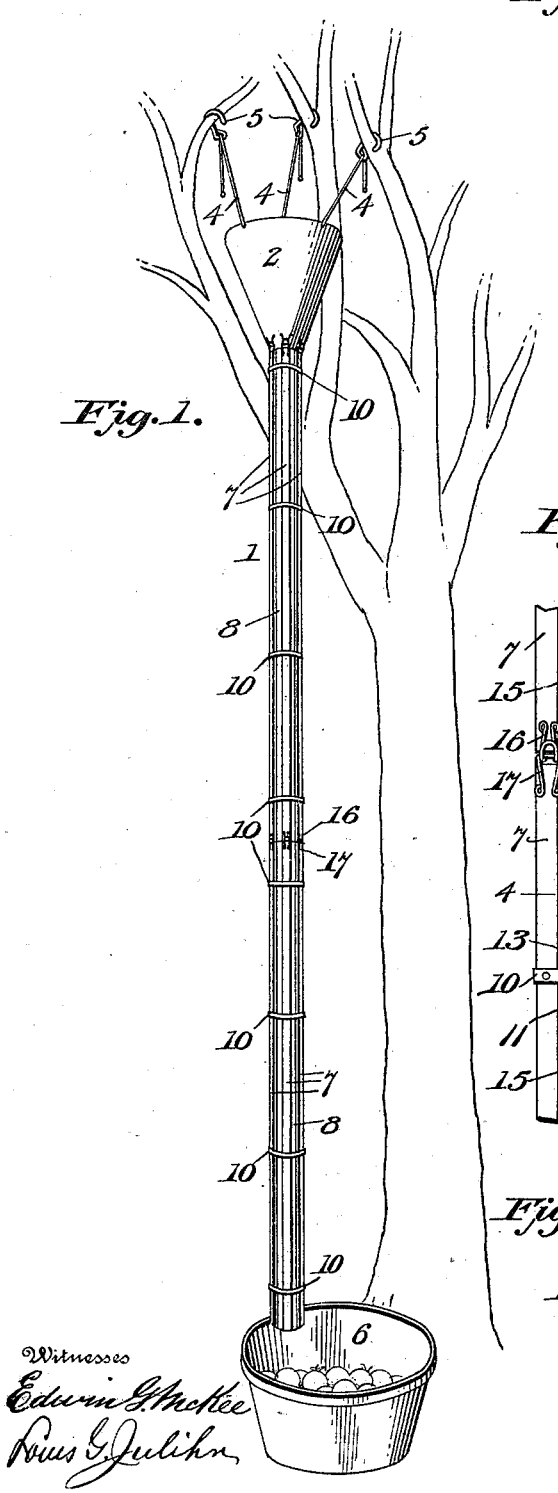
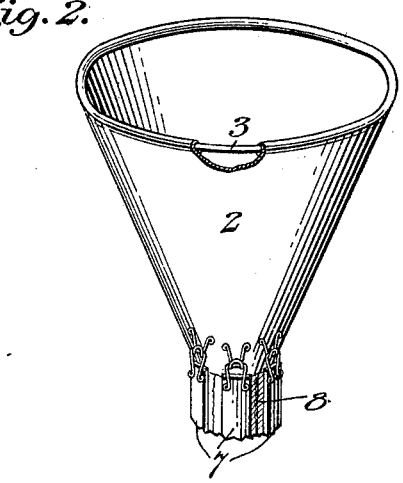
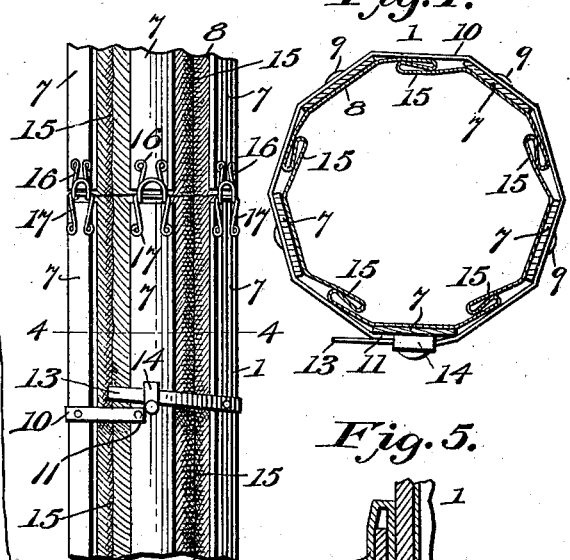
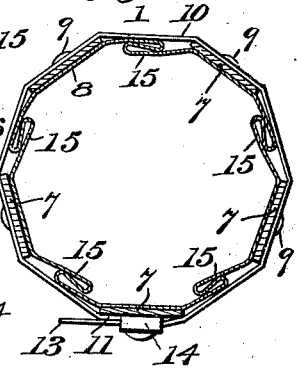
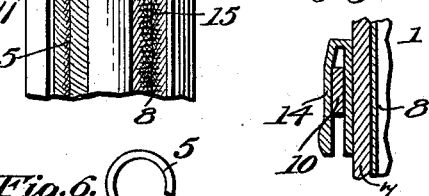
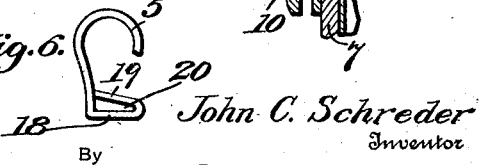
John C. Schreder
Inventor

UNITED STATES PATENT OFFICE.

JOHN C. SCHREDER, OF TECUMSEH, MICHIGAN.

FRUIT-GATHERER.

SPECIFICATION forming part of Letters Patent No. 670,940, dated April 2, 1901.

Application filed May 9, 1900. Serial No. 16,078. (No model.)

*To all whom it may concern:*

Be it known that I, JOHN C. SCHREDER, a citizen of the United States, residing at Tecumseh, in the county of Lenawee and State of Michigan, have invented a new and useful Fruit-Gatherer, of which the following is a specification.

My present invention relates to a novel fruit-gatherer or harvesting device; and the object in view is to provide a conveyer designed to convey fruit from a point among the branches of the tree to a receptacle located upon the ground without bruising or marring the fruit in transit or upon its delivery to the receptacle.

To this end the invention consists in constructing a conveyer in a plurality of detachable sections and in providing means for yieldingly constricting the conveyer throughout its length to cause it to oppose sufficient resistance to the passage of the fruit to prevent violent movement of the latter, which would cause it to be bruised while passing through the conveyer or when deposited in the receptacle below the discharge end thereof, the conveyer constructed as described being provided with means for leading the fruit to it for delivery to the receptacle.

Considered in its more specific aspect the invention consists in constructing the conveyer in substantially tubular form by flexibly connecting a series of longitudinal slats, which are yieldingly urged toward each other to constrict the receptacle by means of elastic constricting-bands having means for increasing or decreasing their resistance to the expansion of the conveyer in order that the latter may be adapted for the harvesting of fruits of different species.

The invention consists, further, in certain details of construction and arrangement, all of which will be hereinafter fully described, illustrated in the accompanying drawings, and defined in the appended claims.

In said drawings, Figure 1 is a general view illustrating the application of my fruit-gatherer. Fig. 2 is a detail perspective view of the receiving funnel or hopper and the upper extremity of the conveyer. Fig. 3 is a fragmentary elevation of the contiguous ends of two sections of the conveyer, showing the connecting means and one of the constricting or contracting bands. Fig. 4 is a transverse sectional view on the line 4 4 of Fig. 3, but on a somewhat larger scale than said figure. Fig. 5 is a detail view of one of the band-retaining clips, showing one of the bands held therein; and Fig. 6 is a detail view of one of the supporting-hooks.

Referring to the numerals of reference employed to designate corresponding parts and structural characteristics throughout the several views, 1 indicates my conveyer, which is of substantially tubular form and is provided at its upper end with a receiving funnel or hopper 2, having its upper edge stiffened by a bead 3, around which the material of the hopper is folded and secured in place, as by sewing or otherwise. The hopper and its attached conveyer are designed to be suspended in an upright position by suspending-cords 4, secured at one end to the bead 3 and carrying adjustable supporting-hooks 5, which in practice are designed to be hooked over the branches of a fruit-tree for the purpose of supporting the hopper within convenient reach of the harvesters, who are supposed to pick the fruit and deposit it in the hopper 2 for conveyance to a suitable receptacle 6, placed upon the ground or otherwise supported under the lower or discharge end of the conveyer. The conveyer is made up of any desired number of sections, each of which comprises a circumferential series of longitudinally-disposed slats 7, which are connected by a flexible wall or lining 8, of tubular form, connected to the slats at proper intervals by clout-nails 9. At suitable intervals upon each section I provide constricting or contracting bands 10, of rubber or other suitable elastic material, encircling the series of slats and having one end, 11, permanently secured to one of the slats and the opposite end, 13, adjustably retained, for instance, by a spring-clip 14, located upon the slat to which the end 11 of the band is permanently connected. The bands 10 are preferably tacked or otherwise secured to each of the slats; but, if desired, they may be secured only at their ends, as the purpose of these bands is to yieldingly urge the slats together for the purpose of constricting the conveyer without presenting such resistance to the expansion of the conveyer as would prevent the passage of the fruit. The contraction of the conveyer under the impulse of the elastic bands will cause the canvas or other flexible wall 8 to fold longitudinally at points intermediate of the slats, as indicated at 15. These folds contain the surplus of material, which is utilized to permit the expansion or distention of the conveyer, and constitute internal longitudinally-disposed cushions, which receive the actual contact of the fruit being harvested, so that those surfaces which are yieldingly urged against the fruit to prevent its too-rapid gravitation are in themselves sufficiently soft and yielding to insure the passage of the fruit without danger of its being abraded. The tubular sections thus constructed are connected by engaging hooks and eyes 16 and 17, carried upon the contiguous extremities of the alined slats of opposed sections, and similar connecting means is provided, as illustrated in Fig. 2 of the drawings, for connection of the hopper 2 to the extremity of the upper section of the conveyer.

In order to facilitate the proper suspension of the device from the branches of different trees, it is necessary that the hooks 5 should be made adjustable upon the suspending-cords, and I therefore prefer to bend the end 18 of the shank of each hook 5 at a right angle to the shank, the extremity 19 of said end being then doubled back upon the end 18 into slightly-divergent relation thereto to form a narrow elongated eye 20, through which the cord 4 is passed and knotted to prevent the accidental release of the hook. When it is desired to suspend the hopper, it is simply necessary for the harvester or other operator to slide the hooks along the cords 4 until they are properly located for engagement with the branches to retain the hopper in its proper upright position, the weight of the device serving to draw the cords 4 into the narrow ends of the eyes 20, where the cord is gripped to retain the hook in its proper position.

In operation the device is suspended from the branches of the fruit-tree, as illustrated in Fig. 1 of the drawings, and the fruit is thrown into the hopper 2 by the harvesters. The fruit gravitates from the hopper into the conveyer, where it is yieldingly gripped between the cushioning folds 15 and urged inwardly by the constricting-bands 10, which latter are not of sufficient strength to actually prevent the passage of the fruit, but oppose only such resistance to the expansion of the conveyer as will insure such retardation of the gravitating fruit as will prevent the latter from being bruised either during its passage through the conveyer or when it is discharged from the conveyer into the receptacle 6 provided for it.

From the foregoing it will be observed that I have produced a simple, inexpensive, and highly-efficient fruit-gathering device by means of which fruit of any species may be conveyed from the tree to a convenient point of delivery without liability to such injury as will affect its salability; but while the present embodiment of my invention appears at this time to be preferable I reserve the right to effect such structural variations as may be properly comprehended within the scope of the protection prayed.

What I claim is—

1. A fruit-gatherer comprising a hollow conveyer yieldingly constricted throughout its length, and means for leading the fruit to the conveyer.

2. A fruit-gatherer comprising a hollow conveyer composed of flexibly-connected, yieldingly-retained slats.

3. A fruit-gatherer comprising a hollow conveyer composed of a series of flexibly-connected slats, and an elastic constricting device yieldingly retaining the slats against transverse separation.

4. A fruit-gatherer comprising a hollow conveyer composed of a series of flexibly-connected slats, an elastic constricting device connecting said slats, and means for adjusting the resistance opposed by said device to the lateral separation of the slats.

5. A fruit-gatherer comprising a conveyer, a constricting device opposing a yielding resistance to the expansion of the conveyer, and means for regulating the resistance opposed by said device.

6. A fruit-gatherer comprising a flexible conveyer having a series of longitudinally-disposed cushioning folds, and a yielding conveyer-constricting device arranged to yieldingly retain the conveyer against expansion.

7. A fruit-gatherer comprising a flexible conveyer having a series of longitudinally-disposed cushioning folds, longitudinally-disposed slats supporting the conveyer, and means for yieldingly retaining the slats against lateral separation.

8. A fruit-gatherer comprising a conveyer composed of a substantially circular series of longitudinally-disposed slats, a tubular flexible lining connected to the slats and having longitudinal cushioning folds located intermediate of the slats, and an elastic constricting-band encircling the conveyer.

9. A fruit-gatherer comprising a conveyer composed of a substantially circular series of longitudinally-disposed slats, a tubular flexible lining connected to the slats and having longitudinal cushioning folds located intermediate of the slats, an elastic constricting-band encircling the conveyer, and means for regulating the resistance opposed by said band to the lateral separation of the slats.

10. A harvester comprising an expansible conveyer, an elastic constricting-band encircling the conveyer, and means for adjustably retaining one end of said band, whereby the resistance opposed by the band to the expansion of the conveyer may be regulated.

11. A fruit-gatherer comprising a conveyer composed of a series of flexibly-connected slats, an elastic band permanently connected at one end to one of the slats and encircling the conveyer, and a spring-clip carried by one of the slats and adjustably engaging the other end of the band.

12. A fruit-gatherer comprising a hopper, a conveyer composed of a plurality of detachable sections, and means for yieldingly constricting the conveyer throughout its length.

13. A fruit-gatherer comprising detachable sections each composed of a series of slats, and a flexible lining connecting the slats, engaging hooks and eyes carried by the contiguous ends of the slats of opposed sections, and constricting-bands encircling each of said sections.

14. A fruit-gatherer comprising a conveyer yieldingly constricted throughout its length and provided with a terminal hopper.

15. A fruit-gatherer comprising a hopper and a flexible conveyer stiffened by a series of longitudinally-disposed separated slats.

16. A fruit-gatherer comprising a hopper and a flexible conveyer having a circumferential series of longitudinally-disposed cushioning folds extending inwardly from the wall of the conveyer.

17. A fruit-gatherer comprising a hopper and a flexible conveyer stiffened by a series of longitudinally-disposed slats and provided with cushioning devices extending inwardly from the walls thereof.

18. A fruit-gatherer comprising a hopper, a flexible conveyer stiffened by a series of longitudinally-disposed slats and provided with internal longitudinally-disposed cushioning folds formed by the surplus material of the conveyer intermediate of the slats.

In testimony that I claim the foregoing as my own I have hereto affixed my signature in the presence of two witnesses.

JOHN C. SCHREDER.

Witnesses:
W. J. INGERSOLL,
ALVA M. WARING.